United States Patent
Breimesser et al.

(10) Patent No.: US 6,944,512 B2
(45) Date of Patent: Sep. 13, 2005

(54) DEVICE AND METHOD FOR CARRYING OUT THE DECENTRALIZED PRODUCTION OF DESIRED PRODUCTS FROM DIFFERENT STARTING MATERIALS, AND AN AUTOMATED PROCESS SYSTEM

(75) Inventors: Fritz Breimesser, Nuremberg (DE); Joerg Hassel, Erlangen (DE)

(73) Assignee: Seimens Aktiengesellschaft, Munich (DE)

( * ) Notice: Subject to any disclaimer, the term of this patent is extended or adjusted under 35 U.S.C. 154(b) by 0 days.

(21) Appl. No.: 10/409,062

(22) Filed: Apr. 9, 2003

(65) Prior Publication Data

US 2005/0102320 A1    May 12, 2005

Related U.S. Application Data

(63) Continuation of application No. PCT/DE01/03863, filed on Oct. 9, 2001.

(30) Foreign Application Priority Data

Oct. 9, 2000    (DE) ................................ 100 49 855

(51) Int. Cl.⁷ ............................................ G06F 19/00
(52) U.S. Cl. ........................... 700/96; 700/169; 700/9; 705/39; 713/201; 221/7
(58) Field of Search .......................... 700/2, 9, 91, 96, 700/169; 705/39; 713/201; 221/7, 131, 9, 221/2, 13, 244

(56) References Cited

U.S. PATENT DOCUMENTS

| 5,594,786 | A | * | 1/1997 | Chaco et al. ............. 379/93.09 |
| 6,039,251 | A | * | 3/2000 | Holowko et al. ............. 235/380 |
| 6,283,322 | B1 | * | 9/2001 | Liff et al. ........................ 221/7 |
| 6,742,125 | B1 | * | 5/2004 | Gabber et al. ............... 713/201 |

FOREIGN PATENT DOCUMENTS

| DE | 199 54 855 C1 | 4/2000 |
| DE | 100 15 423 A1 | 10/2001 |
| EP | 0 547 895 A1 | 6/1993 |
| FR | 2 739 951 A1 | 4/1997 |
| WO | WO 97/26587 A1 | 7/1997 |

* cited by examiner

Primary Examiner—Kidest Bahta
(74) Attorney, Agent, or Firm—Sughrue Mion, PLLC

(57) ABSTRACT

An arrangement, system and process for producing desired products (1) in at least one decentralized automated process system (3), which processes starting materials (2) provided therefor into the respective product (1) in accordance with formulation data (25) that are input into the process system (3). The process system (3) is connected to a remote central computational device (28) via a communications medium (27). An input device (22), which is also connected to the communications medium (27), serves for inputting a product selection (37), whereby the central computational device (28) obtains, according to the received product selection (37), the formulation data (25) that is necessary for producing the desired product (1), or conveys this formulation data to the process system. The formulation data are obtained from a formulation data collection for the automated process system (3). Each production process of the products (1) is logged with regard to quantity and quality-relevant process data (13') in the central computational device (28).

29 Claims, 1 Drawing Sheet

| 1 | Product | 26 | Data Interface |
| 2 | Starting Materials | 27 | Communication Medium |
| 3-3" | Process Systems | 28 | Central Computational Device |
| 4-9 | Process Modules | 30-33 | Formulation Databases |
| 10 | Control Unit | 34-36,46 | Other Computational Devices |
| 11 | Fluid Unit | 38 | ID Device |
| 18 | Power Supply | 39 | Billing Device |
| 20 | Control System | 40 | Memory Unit |
| 24 | Control Element | 45 | Inventory Device |

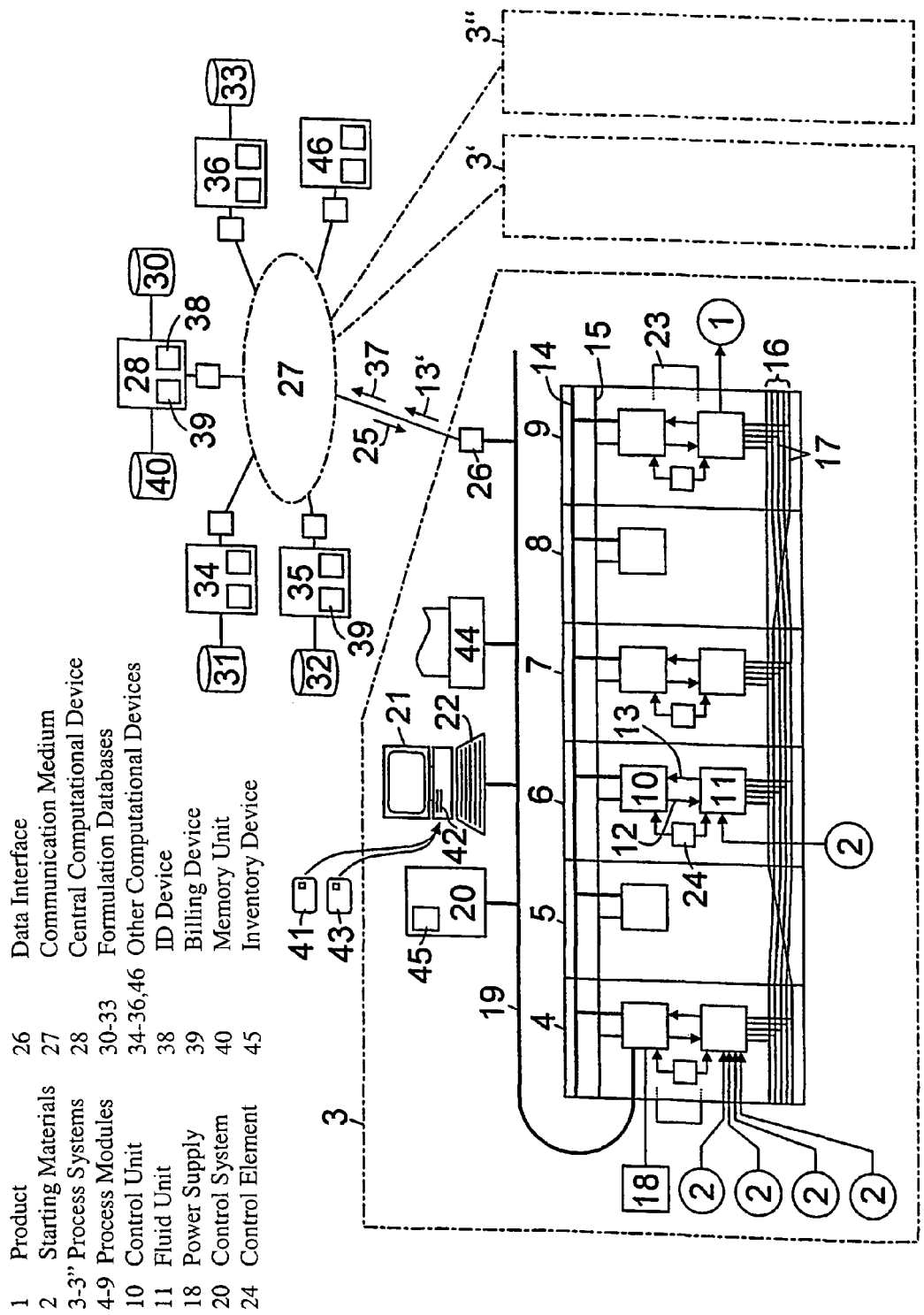

DEVICE AND METHOD FOR CARRYING OUT THE DECENTRALIZED PRODUCTION OF DESIRED PRODUCTS FROM DIFFERENT STARTING MATERIALS, AND AN AUTOMATED PROCESS SYSTEM

This is a Continuation of International Application PCT/DE01/03863, with an international filing date of Oct. 9, 2001, which was published under PCT Article 21(2) in German, and the disclosure of which is incorporated into this application by reference.

FIELD OF AND BACKGROUND OF THE INVENTION

In the chemical, pharmaceutical, medical, biological and cosmetics industries, products are often required in relatively small quantities and are produced from different starting materials using different formulations, e.g. for different applications or different persons. One example is the medication of patients, with preparations or combinations thereof individually tailored to the patients or the corresponding illness. In view of the small quantities and the individual formulations of such products, their central production and sale to the respective end customers is highly work-intensive and costly. On the other hand, often only one or just a few potential manufacturers have the know-how, or, in particular, the formulations as well as the authorization, either as patent holder or licensee, to produce the individual products. In addition, certain safety and/or quality requirements must be met in the manufacture of many of these products. This is true especially for the production of medicines, which may be supplied only in the specified quality and composition to authorized persons, e.g., pharmacists, physicians or patients.

OBJECTS OF THE INVENTION

One object of the invention, in view of the above-described problems, is to provide a less work-intensive and less costly process for producing products of different formulations.

SUMMARY OF THE INVENTION

According to the invention, this and other objects are attained by the arrangements, systems and methods claimed in the present application. According to one formulation, the invention is directed to an arrangement for decentralized production of selected products from differing starting materials. The arrangement includes: at least one decentralized automated process system, which processes the supplied starting materials into a selected product as a function of formulation data supplied to the process system; a central computational device geographically remote from the process system; a data interface associated with the process system, which exchanges data via a communications medium with the central computational device; and an input device connected to the data interface, through which a product selection is entered. The central computational device is configured to receive the product selection; to access, as a function of the received product selection, a formulation data collection containing a plurality of sets of formulation data for a plurality of differing products; to select at least one of the formulation data sets matching the product selection; and to transmit the formulation data contained in the selected formulation data set to the process system via the communications medium.

The solutions according to the invention substantially shorten the current process chain from the manufacturer via the distributor to the end customer.

This is made possible by producing different desired products in a decentralized, i.e., local, automated process system, which is capable of processing supplied starting materials into the respectively desired products as a function of the formulation data that is delivered to it. Examples of such automated process systems are found in the German Patent Applications carrying the official file numbers 199 54 855.2 and 100 15 423.9. The process systems described in these documents have configurable process modules which automatically execute predefined partial processes and which are connected to a higher-level control system via a data connection. These process modules may be various reactor modules including, for instance, microreactors, pump modules, filter modules, power supply modules, fluid supply and fluid discharge modules, analysis modules, etc. Configurability should be understood as both parameterization of the individual process modules and the mutual arrangement and interconnection of these modules. The connection of the process modules also includes the exchange of the materials to be processed among the individual process modules.

Furthermore, after a product selection has been entered and transmitted to a remote central computational device, the remote device obtains, or acts as mediator in obtaining, the formulation data required to produce the desired product and transmits this data to the automated process system. Central in this case means that the remote computational device is available to obtain the required formulation data for the at least one decentralized process system as well as for other similar process systems at other locations. The product selection can be entered on the input device e.g. in the form of a product name, a chemical formula, a general basic formulation, etc. via a user dialog or by reading, for instance, a medication directly from a patient chart. It is also possible to define the desired product in a dialog with the remote central computational device. In the most general case, the formulation data determined as a function of the product selection and then transmitted to the process system contain all the information relevant for the production of the desired product. This includes, in particular, the required starting materials, the necessary process steps, process parameters, such as material quantities, flow rates or temperatures, etc. Based on this information, the process system is able to produce the desired product.

For example, in the case of the aforementioned modular process system, the respectively required process modules are selected and configured. Configuration can be at least partly automated, e.g., by automatically setting the process parameters in the individual process modules based on the transmitted formulation data. Furthermore, the process system, as a function of the information on the required starting materials contained in the formulation data, can automatically select these starting materials from a plurality of different available starting materials and can feed them to the process. To the extent that configurations, e.g., the selection of the respectively required process modules and their interconnection, are done manually, the actual configurations can be checked for accuracy against setpoint configurations defined by the formulation data.

A preferred communications medium for the data exchange between the decentralized process system and the remote central computational device is the Internet, a global network of computational devices that is organized in such a way that the computational devices can communicate with one another. The basis is the client-server principle, according to which certain computational devices (servers) offer services that can be requested by the other computational devices (clients). An Internet server is accessed by means of known Internet browsers, and communication within the Internet takes place using predefined Internet protocols. The Internet services also include the possibility of logging into another computational device (host) for dialog operation, possibly after access authorization has been checked, in order to copy (download) files from, upload files to, or execute operations in the remote computational device. Other communications media in addition to or in lieu of the Internet or an Intranet could be utilized.

According to a first alternative, the central computational device, based on the received product selection, accesses a formulation data collection containing formulation data for many different products and selects at least one formulation data set matching the desired product, and transmits the formulation data to the process system. The formulation data collection can be divided among several formulation databases, which in turn can be operated in conjunction with other associated computational devices, e.g., of different chemical or pharmaceutical companies. In order to obtain the formulation data, e.g., the central computational device contacted by the decentralized process system can access these other computational devices and their formulation databases via the communications medium.

In a second, alternative solution, the central computational device does not directly procure the required formulation data but rather refers the sender of the product selection to one or more decentralized formulation databases that contain a formulation data set that matches the desired product. The further procedure to transmit the suitable formulation data to the process system will then take place between the process system and the formulation database to which it was referred.

To ensure the replenishment of consumed starting materials, the automated process system preferably includes a device connected with the data interface for managing the starting material inventory. When the inventories get low, the process system can thus automatically reorder the required starting materials via the data interface from a manufacturer that offers such a service through a computational device connected to the communications medium.

To satisfy prescribed safety requirements, e.g., in the case of drugs, and to allow billing of the services provided in connection with obtaining the formulation data, the central computational device preferably includes a device for checking the authorization and/or identity of the sender transmitting the product selection and preferably also a device for billing the services that are provided in connection with obtaining the formulation data, including any licenses required therefor. If the central computational device provides only partial services, e.g., by referring the inquiring process system to a decentralized formulation database, this decentralized formulation database preferably also has a device for checking authorization and/or identity and a device for billing the provided services. The sender transmitting the product selection to the remote central computational device should primarily be understood to be the corresponding process system. The input device itself can check the identity or authorization of the person entering the product selection.

For quality assurance and/or license fee billing, the process system preferably automatically determines process data that is relevant to the quality and/or the quantity of the product produced and transmits this data via the data interface and the communications medium to the central computational device or the formulation database that is supplying the formulation data. There, the process data is correspondingly analyzed and stored.

To put it more concisely and in different words: the process system of the arrangement according to the invention is a local device in which desired products can be produced from a predefined number of starting materials according to individual formulations. This device is equipped with a user interface (input device) and a provider interface (data interface). The customer identifies himself on the user interface and enters a product selection. The provider interface then establishes contact with a licensor for the desired product, with manufacturers of the necessary starting materials and with billing offices. Also provided are devices for quality control and documentation of the transactions.

BRIEF DESCRIPTION OF THE DRAWINGS

The invention will now be described with reference to an exemplary embodiment depicted in the drawing.

DETAILED DESCRIPTION OF THE PREFERRED EMBODIMENTS

For the decentralized production of a presently required product 1, in this case made from fluid (i.e., liquid and/or gaseous) starting materials 2, a decentralized modular automated process system 3 is provided, which is located, for example, in a laboratory, a pharmacy or a hospital. Other similar process systems 3', 3" may exist at many different locations. The process system 3 includes process modules 4 to 9, which may be variously combined and in which partial processes are automatically carried out to produce the respectively desired product 1. The process modules 4 to 9 can be various reactor modules including, for instance, microreactors, pump modules, filter modules, power supply modules, fluid supply and fluid discharge modules, analysis modules, etc. Active process modules 4, 6, 7 and 9 (i.e., process modules that carry out the present partial processes) each have a control unit 10 and a fluid unit 11. The actual partial process is carried out within the fluid unit 11 as a function of control signals 12 of the control unit 10. Process signals 13 recorded in the fluid unit 11, e.g., values related to temperature, pressure or analysis, are transmitted to the control unit 10. The control units 10 in the different process modules 4 to 9 are connected with one another via a data bus 14 and a power supply bus 15. The fluid units 11 are connected with one another via a fluid bus 16, which includes a plurality of channels 17 that transport the starting materials 2 to be processed, and possibly intermediate products. These channels 17 extend in parallel within the active process modules 4, 6, 7 and 9. This makes it possible individually to interconnect the channels 17 of two adjacent active process modules, in this case 4 and 6 or 7 and 9, in a non-parallel structure by interposing passive process modules 5, 8 with corresponding fixed channel configurations. As an alternative thereto, the interconnection of the channels 17 can also be controlled by means of an interposed active process module whose fluid unit is, for example, configured as a channel matrix with controllable valves.

The process module 4 serves to provide basic functions to the process system 3. For this purpose, the control unit 10 is connected via a data connection 19, e.g., an external bus, to an external power supply source 18 and a higher-level control system 20, having a visualization device 21 and an input device 22. Alternatively, the data connection 19 can also be embodied as a direct continuation of the data bus 14.

As schematically shown here, the data bus 14, the energy supply bus 15 and the fluid bus 16 each have internal bus segments within the process modules 4 to 9 mounted side by side on a common carrier 23. The busses 14 to 16 are formed by sliding or placing the correspondingly required process modules 4 to 9 onto the carrier 23.

The process modules 4 to 9 can be configured internally as well as externally. The internal configuration includes, in particular, the parameterization of the process modules 4 to 9. To this end, the parameter values can be transmitted from the higher-level control system 20 via the data connection 19 and the data bus 14 to the control units 10 in the individual process modules 4 to 9. In addition, the process modules 4 to 9 can also be manually adjusted via control elements 24. External configuration in this case is defined as the integration of the individual process modules 4 to 9 into the process system 3. This includes not only the selection and sequence of the process modules 4 to 9 but also the interconnection of the channels 17 between adjacent process modules. Channels 17 between two adjacent process modules, e.g., 4 and 6, that are not to be continued in parallel, are formed, as described above, by interposing a corresponding passive process module 5 with an appropriate channel configuration. All the information on the internal and external configurations of the individual process modules 4 to 9 is stored in configuration signaling devices within the individual control units 10. From there, the higher-level control system 20 can call up this information via the data bus 14 and the data connection 19.

The example of the automated process system 3 described thus far is the subject of the previously mentioned prior German Applications with the official file numbers 199 54 855.2 and 100 15 423.9.

The production of the respectively desired product 1 in the process system 3 requires the supply of the necessary starting materials 2, a specific interior and exterior configuration of the process modules 4 to 9 and finally a specific process sequence for the processing of the starting materials 2 in the fluid units 11 of the process modules 4 to 9. The higher-level control system 20 controls the general process sequence while the associated control units 10 control the partial processes in the fluid units 11. All the required information is contained in the formulation data 25 for the product 1 to be produced. To enable access to this formulation data 25, the process system 3 has a data interface 26 connected to the data connection 19 for exchanging data with a central computational device 28 via a communications medium 27, which, in this embodiment, is the Internet.

The central computational device 28 can access a formulation data collection containing formulation data for many different products. This formulation data collection can on the one hand be located in the central computational device's own formulation database 30 and on the other hand distributed among other formulation databases 31, 32, 33 of other computational devices 34, 35, 36 of different information providers, in this case, for instance, chemical or pharmaceutical companies. A product selection 37 for an actually required product 1 is entered on the input device 22 of the decentralized automated process system 3 via a user dialog. The person entering the product selection 37 identifies himself or herself, e.g., by inserting a chip card 41 into a card reader 42 on the input device 22. Alternatively, the card reader 42 can also read the product selection 37 from a patient chart 43. The product selection 37 is then transmitted via the data interface 26 to the central computational device 28, which selects at least one formulation data set matching the desired product 1 from the formulation data collection. It transmits the formulation data 25 contained in this formulation data set to the process system 3 via the communications medium 27. To this end, the central computational device 28 can access other computational devices 34 to 36 and their formulation databases 31 to 33 to obtain the formulation data 25 from there.

Alternatively, the central computational unit 28, based on the product selection 37, determines a suitable external formulation database, e.g., 32, and establishes a connection between the computational device of that database, e.g., 35, and the process system 3, in order to facilitate a direct transmission of the formulation data 25 to the process system 3 from the formulation database 32 via its computational device 35. The formulation data 25 is displayed on the visualization device 21 in such a way as to provide the operator of the process system 3 with information on the required starting materials 2 and the required process modules 4 to 9, including their arrangement and parameterization. To the extent that an automatic configuration of individual process modules 4 to 9 is possible, the formulation data 25 can be automatically forwarded to the associated control units 10. Formulation data 25 that contains the actual process sequence to produce the product 1 is automatically transmitted to the higher-level control system 20, which in turn supplies the data required for the partial processes to the control units 10 of the individual process modules 4 to 9.

The selection made in accordance with the formulation data 25 and the arrangement of the required process modules 4 to 9 including their configuration is signaled to the higher-level control system 20 via the aforementioned configuration signaling devices in the control units 10 of the process modules 4 to 9. The control system 20 can thus check the actual configuration compared to a setpoint configuration of the process system 3 defined by the formulation data 25, so that any incorrect structure of the process system 3 or any incorrect parameterization of individual process modules 4 to 9 can be detected and displayed on the visualization device 21. If the determined structural or parameterization errors are not corrected, the entire procedure is aborted in the process system 3. This is reported to the central computational device 28.

The central computational device 28 preferably includes a device 38 for checking the authorization and/or the identity of the sender that transmits the product selection 37, in this case the process system 3. The computational device 28 also preferably has a device 39 for billing the services rendered in connection with obtaining the formulation data 25. Such a device is basically known from "e-commerce" or "e-business" solutions. Analogously, the other computational devices 34 to 36 have corresponding devices 39 for billing the services that they are providing.

As mentioned above, process signals 13 recorded in the fluid units 11 during the process for producing the product 1 are transmitted to the control units 10 in the individual process modules 4 to 9, from where they are forwarded to the higher-level control system 20. The higher-level control system transmits process data 13', relevant to the quality and/or quantity of the produced product 1 via the data interface 26 to the central computational device 28, which stores this data 13' in a memory unit 40, to document the quality and/or quantity of the produced product 1. Based on the documented quantity of the produced product 1, the central computational device 28 can calculate license fees in connection with the billing of the services. In addition, the data related to the produced product 1, particularly acknowledgment data for the end customer of the product 1, can be printed out in the decentralized process system 3 by means of a printer 44.

The higher-level control system 20 of the process system 3 preferably includes a device 45 for managing the inventories of the starting materials 2. If the inventories fall below a predefined minimum quantity of starting materials 2, or if certain starting materials 2 are newly required based on the formulation data 25 received for the corresponding product 1 to be produced, or if a supply deficit is determined during the production of the product 1 based on the determined process data 13, this device 45 automatically causes the respective starting materials to be reordered via the communications medium 27 from a computational device 46 of a manufacturer that offers a corresponding Internet service and is likewise connected to the communications medium 27.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A system for decentralized production of selected products from differing starting materials, comprising:
    at least one decentralized automated process system, which processes the supplied starting materials into a selected product based on formulation data supplied to the process system;
    a central computational device geographically remote from the process system;
    a data interface associated with the process system, which exchanges data via a communications medium with the central computational device; and
    an input device connected to the data interface, through which a product selection is entered;
    wherein the central computational device is configured to receive the product selection; to access a formulation data collection containing a plurality of sets of formulation data for a plurality of differing products; to select at least one of the formulation data sets matching the product selection; and to transmit the formulation data contained in the selected formulation data set to the process system via the communications medium.

2. The system as claimed in claim 1, further comprising:
    a plurality of separate formulation databases over which the formulation data collection is distributed;
    at least one further computational device, which is associated with at least one of the formulation databases; and
    a configuration enabling the central computational device to access the further computational device and the formulation database associated with the further computational device.

3. The system as claimed in claim 1, wherein the communications medium comprises a network.

4. The system as claimed in claim 3, wherein the network comprises the Internet.

5. The system as claimed in claim 1, wherein the process system automatically selects the supplied starting materials from an inventory of available starting materials based on information contained in the formulation data regarding the available starting materials, and feeds the supplied starting materials into the process system.

6. The system as claimed in claim 1, wherein the process system comprises a device connected with the data interface and configured to manage an inventory of available starting materials.

7. The system as claimed in claim 1, wherein the central computational device comprises a device configured to check at least one of an authorization and an identification of a sender transmitting the product selection.

8. The system as claimed in claim 1, wherein the central computational device comprises a device for billing services rendered in connection with transmitting the formulation data.

9. The system as claimed in claim 1, wherein the process system automatically generates process data related to at least one of quality and quantity of the selected product and transmits the process data via the data interface and the communications medium to the computational device from which the process system received the formulation data.

10. The system according to claim 1, wherein the processing of the starting materials into the selected product comprises converting the starting material into the selected product by subjecting the starting material to a manufacturing process.

11. The system according to claim 1, wherein the automated process system generates the selected product from the starting material.

12. The system according to claim 1, wherein the starting material comprises at least one of a raw material and an intermediate material for production of the selected product.

13. A system for decentralized production of selected products from differing starting materials, comprising:
    at least one decentralized automated process system, which processes the supplied starting materials into a selected product based on formulation data supplied to the process system;
    a central computational device geographically remote from the process system;
    further computational devices geographically remote from the process system and each with associated formulation databases that contain formulation data for a plurality of differing products;
    a data interface associated with the process system, which exchanges data via a communications medium with the central computational device and the further computational devices; and
    an input device connected to the data interface, through which a product selection is entered;
    wherein the central computational device is configured to receive the product selection; to select at least one of the formulation databases that contains a formulation data set matching the product selection, and to establish a connection between the associated further computational device and the automated process system for transmitting the formulation data contained in the formulation data set of the selected formulation database to the process system via the communications medium and the data interface.

14. The system as claimed in claim 13, wherein the communications medium comprises a network.

15. The system as claimed in claim 14, wherein the network comprises the Internet.

16. The system as claimed in claim 13, wherein the process system automatically selects the supplied starting materials from an inventory of available starting materials based on information contained in the formulation data regarding the available starting materials, and feeds the supplied starting materials into the process system.

17. The system as claimed in claim 13, wherein the process system comprises a device connected with the data interface and configured to manage an inventory of available starting materials.

18. The system as claimed in claim 13, wherein the central computational device comprises a device configured to check at least one of an authorization and an identification of a sender transmitting the product selection.

19. The system as claimed in claim 13, wherein the central computational device and the further computational devices each comprises a device for billing services rendered in connection with transmitting the formulation data.

20. The system as claimed in claim 13, wherein the process system automatically generates process data related to at least one of quality and quantity of the selected product and transmits the process data via the data interface and the communications medium to the computational device from which the process system received the formulation data.

21. An automated process system, comprising:
   process components configured to process supplied starting materials into a selected product in accordance with formulation data provided to the process components;
   an input device configured to input a product selection; and
   a data interface configured to transmit the product selection to a remote central computational device and to receive the formulation data from at least one of the remote central computational device or another remote computational device mediated by the central computational device.

22. A method for decentralized production of selected products from starting materials in at least one automated process system, comprising:
   transmitting a product selection entered on an input device at a decentralized automated process system to a central computational device geographically remote from the process system via a data interface;
   receiving formulation data supplied either from or by operation of the central computational device via the data interface; and
   according to the formulation data, processing the starting materials into the selected product.

23. The method according to claim 22, wherein the formulation data is selected from a collection of sets of formulation data stored in various databases, wherein the formulation data is selected in accordance with the product selection, and wherein the formulation data comprises information needed to generate the selected product.

24. The method according to claim 22, wherein the formulation data comprises manufacturing instructions for the processing system to manufacture the selected product.

25. The method according to claim 22, wherein the processing of the starting materials into the selected product comprises at least a chemical transformation of the starting material into the selected product.

26. The method according to claim 22, wherein the formulation data guides the processing system in producing the selected product.

27. The method according to claim 22, wherein the selected product is produced from a predefined number of starting materials, the predefined number being identified in the formulation data.

28. The method according to claim 22, wherein the processing system comprises at least one active module carrying out at least a portion of the processing of the starting material into the selected product.

29. The method according to claim 28, wherein the processing system further comprises at least one passive module, and wherein the at least one active module comprises a fluid unit and a control unit.

\* \* \* \* \*